Figure 1:
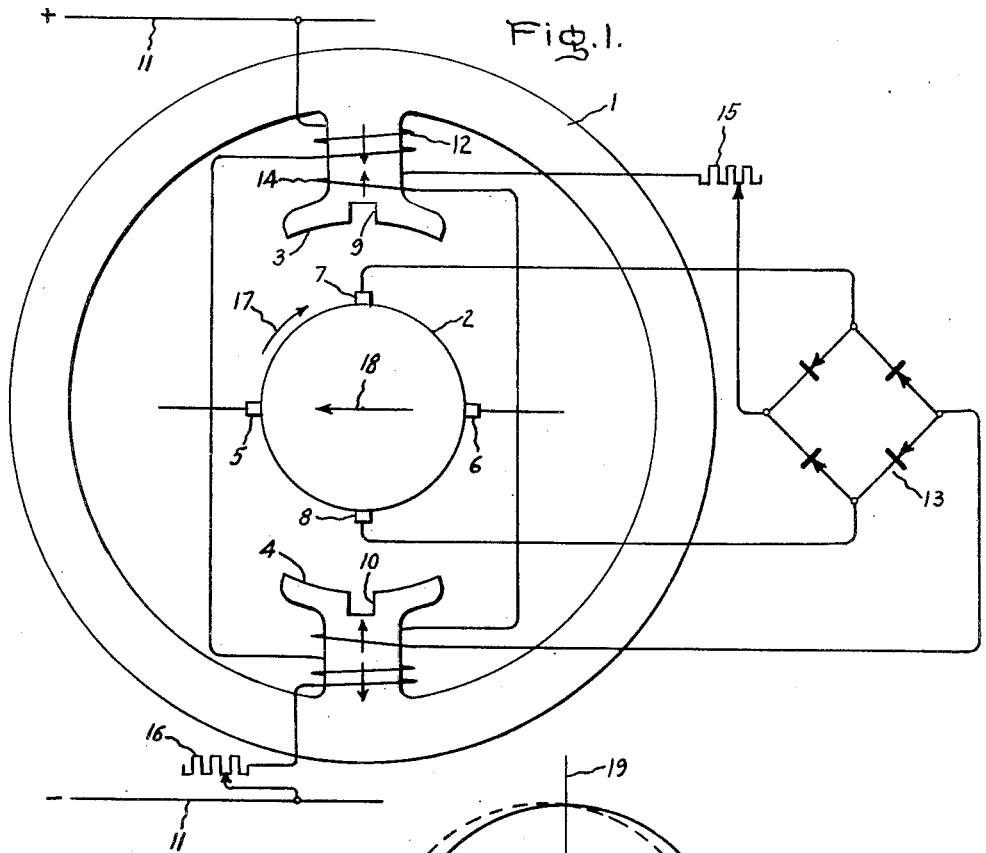

July 11, 1950    M. A. WHITING    2,514,983
DYNAMOELECTRIC MACHINE
Filed Nov. 22, 1947    2 Sheets-Sheet 1

Inventor:
Max A. Whiting,
by Pronell & Mack
His Attorney.

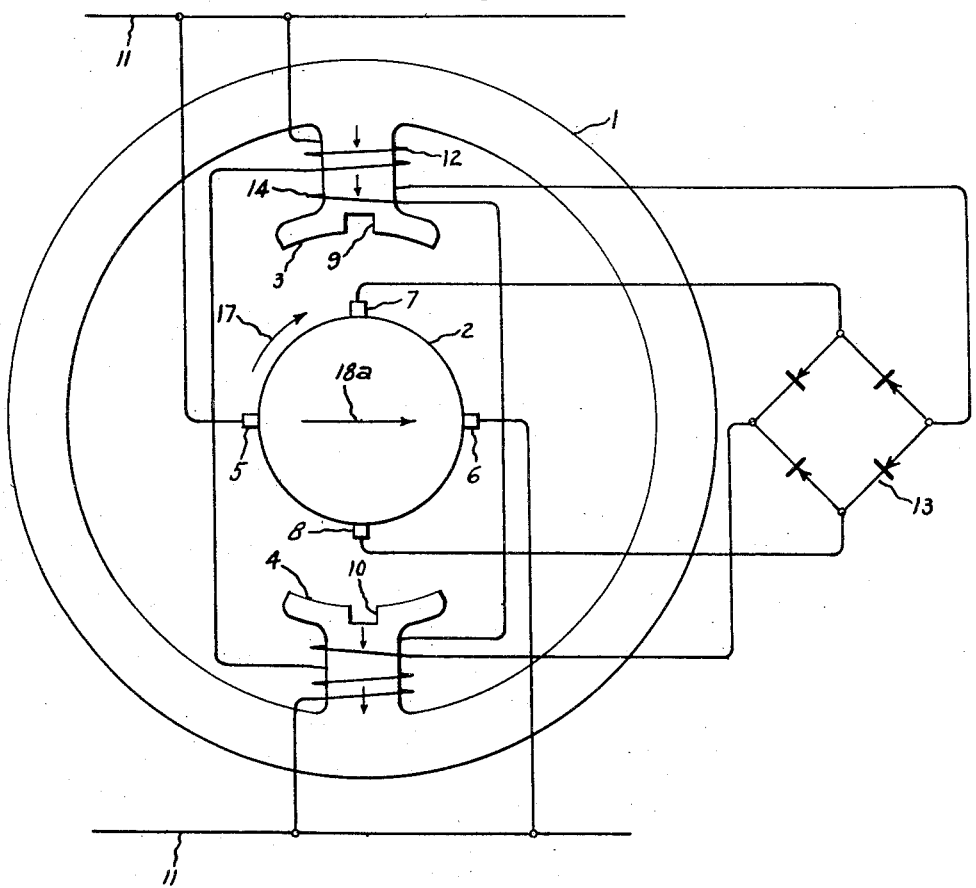

Patented July 11, 1950

2,514,983

UNITED STATES PATENT OFFICE 2,514,983

DYNAMOELECTRIC MACHINE

Max A. Whiting, Schenectady, N. Y., assignor to General Electric Company, a corporation of New York Application November 22, 1947, Serial No. 787,497

11 Claims. (Cl. 322—92)

My invention relates to dynamoelectric machines and more particularly to means for stabilizing the operation of a direct current generator or motor.

In U. S. Patent 2,385,670, issued Sept. 25, 1945, upon my application and assigned to the assignee of the present invention, there is described a direct current generator having a separately excited reference field and a second field acting in quadrature therewith. The combination produces the end result that the output voltage of the machine is made to vary in inverse proportion to variation in output current as the latter is determined by the characteristics of the ultimate load. Such a machine was intended for, and has proved useful as, a source of controlled voltage used to excite a main generator providing variable voltage supply for one or more direct current motors. While the machine described in the above-identified patent may be used either as such an exciter or as itself a main generator, it does require a number of pole pieces equal to twice the number of effective poles of the machine. This is not a pronounced disadvantage when the machine is used as an exciter, but may be found uneconomical when the machine is used as a main generator.

It is an object of the present invention to provide a generator having the general characteristic of the machine of the patented disclosure, i. e. output variable inversely with respect to current in the load circuit, but using pole pieces no greater in number than the number of effective poles of the machine.

Heretofore it has often been desirable to stabilize the operation of a dynamoelectric machine operated as a direct current motor so that change in load current shall not cause a serious loss of torque with consequent change in speed. Conventionally such stability is obtained by the addition of a small amount of stabilizing series field comparable to the flat compounding of a generator. However, when the torque of the driven machine reverses, and causes a regeneration into the motor, the stabilizing field becomes an unstabilizing field. Then too, if it is required that the motor be reversed such a stabilizing field becomes an unstabilizing field if the stabilizing field connections are not reversed. Under many conditions of application it is not practical to reverse the stabilizing field connections in anticipation of regenerative or reversed operation. In the past, the difficulty has often been met by using a larger motor than otherwise necessary so that it will be suitable for the required variety of operating conditions without the use of a stabilizing field, but this entails a waste of copper, iron and other materials.

It is a further object of the present invention to provide simple and inexpensive means for overcoming the above difficulties.

It is a still further object of the present invention to provide a simple and inexpensive dynamoelectric machine utilizing an auxiliary field adapted to provide a certain flux in the machine when the load current is a minimum and to be automatically varied in direction and magnitude to provide for a certain change in said flux with an increase of said current irrespective of the direction of current. Thus, there may be provided a generator which has maximum load voltage when the load current is a minimum and provision for a decrease in said voltage with an increase of load current. This is often desirable in a generator adapted to be used for the control of other machines. Substantially the same construction may be used to provide a motor which has minimum flux and torque when the load current is a minimum and provision for an increase in said flux and torque with an increase of load to provide a motor with a stable operating characteristic over its entire range of operation including reverse or regenerative conditions.

Broadly the means employed in the embodiment herein illustrated and described comprises a dynamoelectric machine having two sets of field windings arranged to be effective along the same polar axis. The machine has a commutated rotor winding with a set of brushes effective across the direct axis and a set of brushes in quadrature with said direct axis brushes. One of the field windings is a main winding and the other field winding is a weaker, or auxiliary, field winding connected through a rectifier to the quadrature brushes. These connections are made in such a way that whenever the auxiliary winding is excited it acts in a certain way with respect to the main field.

Figure 2:
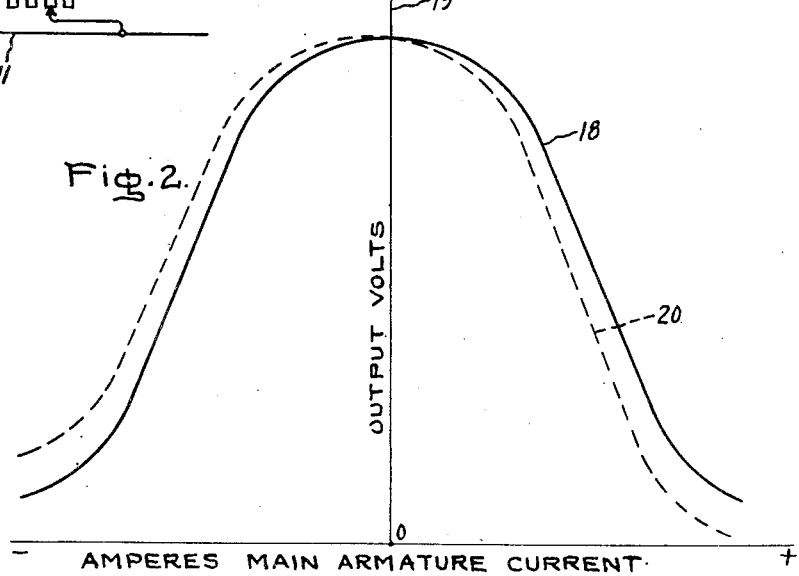

Other aspects and advantages of the invention will become apparent and my invention will be better understood from consideration of the following description taken in connection with the accompanying drawing in which Fig. 1 represents a direct current separately excited dynamoelectric machine suitably embodying my invention and connected for generator operation, Fig. 2 depicts a curve showing the output characteristic of the dynamoelectric machine of Fig. 1, and Fig. 3 represents a modification in which the dynamoelectric machine is connected for motor operation.

In Fig. 1, I have shown an embodiment of my invention applied to a dynamoelectric machine of the direct current type and having a stator portion 1 of magnetic material. The machine has a cooperating rotor portion comprising an armature winding which with its associated commutator is diagrammatically represented by circle 2. For the sake of simplicity the machine is shown provided with a single pair of poles 3 and 4, although it may be found desirable to employ a greater number of main poles and to use commutating poles as well. A set of main or load brushes 5 and 6 contact the commutator to provide the load circuit of the machine, and a second set of brushes 7 and 8 contact the commutator in quadrature with the load brushes. It should be understood that the load brushes 5 and 6 and the cross brushes 7 and 8 are indicated in the drawing according to the commutating position of the armature conductors which they serve and not according to actual physical location of the brushes relative to the pole pieces.

The pole pieces 3 and 4 are preferably notched at their inner periphery by notches such as 9 and 10 which extend the full axial length of the poles to provide relatively inactive zones in which commutation by the cross brushes may conveniently take place. The increased air gap provided by these slots causes the flux density of the field in the air gap at these points to be reduced with consequent reduction of the voltage between commutator bars at the moment of commutation.

A substantially constant voltage direct current excitation bus 11 is used to separately excite the main field winding 12 wound upon the pole pieces 3 and 4. Generally for generator operation it will be found desirable to provide such separate excitation rather than attempt to connect the main field either in shunt or in series with the load circuit of the machine.

It will be understood by those skilled in the art that when the machine is operated with current in the load circuit between brushes 5 and 6, there will be a voltage across the auxiliary brushes 7 and 8. The output from these cross brushes is passed through a bridge rectifier 13. This rectifier is preferably of a dry type and the choice of rectifier materials, such as copper oxide or selenium, is not an essential factor to the operation of my invention. The output of the rectifier is used to energize an auxiliary field winding 14 provided upon the pole pieces 3 and 4. The preferred number of turns of auxiliary field winding 14 will usually be less than those of the main field winding 12 and the total cross-section of this auxiliary field need usually be no more than one-fifth or possibly one-tenth of that of the main separately excited field winding 12.

Since only a very small current, for exciting the auxiliary field, is taken from the cross brushes 7 and 8, their proper operation is favored by designing them of high resistance and for a narrow arc of contact. Connections between the cross brushes and the rectifier and between the rectifier and the auxiliary field are made so that by virtue of the rectifier action the auxiliary field 14 will always oppose or always aid the main field 12.

It may be desirable to also provide rheostats, such as rheostat 15 in the circuit of the auxiliary field and rheostat 16 in the circuit of the main field winding. If desired such rheostats can be mechanically connected together.

In order to understand the theory of operation, let us first assume that the dynamoelectric machine shown in Fig. 1 is a generator being driven at substantially constant speed by some outside force of mechanical power (not shown) so that the armature is continuously rotating in a clockwise direction as shown by the directional arrow 17. This causes the armature conductors to cut the steady field flux caused by current in main winding 12 and a voltage is induced between the main brushes 5 and 6. Assuming a complete circuit between these brushes and the generator load (not shown), current flows in this circuit and in the armature conductors. Current in the armature conductors causes an armature reaction flux which may be assumed to be in the direction represented in the drawing by arrow 18 and this flux component acts along the main axis to, in turn, induce a voltage between the quadrature brushes 7 and 8. Since the quadrature brushes are connected externally to the rectifier 13 current will flow to the rectifier and from the rectifier to auxiliary field 14 which, for generator action, is so connected to the rectifier output that the flux caused by auxiliary field winding 14 opposes the main field.

Even in the absence of cross-brushes 7 and 8 and field 14, the armature reaction would normally cause the net effective flux (hence the voltage delivered to the load) to be less than for the no-load condition, as is well-known in the art. In the generator of Fig. 1, therefore, the ordinary effect of armature reaction and the added effect of armature reaction via cross-brushes 8 and 9 through rectifier 13 to field 14 are both subtractive with respect to the effect of main separately-excited field 12. Hence, the decline of output voltage with increase of load occurs at a much greater rate than in a generator lacking the novel features of Fig. 1, but otherwise of comparable design. A most important feature of my invention is the fact that this tendency to reduce output voltage will occur with an increase in main load current in either direction. Thus when the generator is used to furnish current for a motor applied to a load, and the current increases (as will be the case when the operator suddenly throws the motor controls over to a higher speed position) there will be an increase of current in one direction through the armature of the generator and with my invention the output current in the loop circuit between generator load brushes and the motor will decrease, while with an increase in loop current in the other direction, current being inverted into the generator (as, for example, in an acceleration of the system in the opposite direction of movement) there is an increase in loop current in the opposite direction, but the increase still has the same action, reducing the generator output voltage to alleviate the condition. Even with inverted current in the armature so that armature reaction 18 is in the opposite direction, current in field 14 will, because of the action of rectifier 13, be in the same direction as before to oppose the main field flux. Thus the effect of field 14 will be equal at equal, although opposite, armature currents and the output voltage of the generator will have a substantially symmetrical characteristic when plotted.

In Fig. 2, I have shown this characteristic by plotting generator voltage against plus and minus values of main armature current. In Fig. 2, 18 represents the induced voltage characteristic and it is seen that this curve is symmetric about the 0 axis 19. The output characteristic, i. e. terminal volts, is shown by curve 20, and it is seen that this curve 20 is, except for the difference caused by voltage drop across the brushes and internal IR drop, both of which are small, also practically symmetric.

Referring now to Fig. 3 for consideration of the operation of the dynamoelectric machine when used as a motor, the connections from brushes 5 and 6 are connected to a source of constant voltage direct current supply from wires 11. The field winding 12 is excited from wires 11 and the armature is caused to turn in the direction indicated by the arrow 17. As before, an armature reaction flux is set up and current flows from the cross-brushes to the rectifier and from the rectifier to the auxiliary field. However, with motor operation the armature reaction is in the opposite direction as indicated by arrow 18a and it is desirable to have the auxiliary field act cumulatively with the main field rather than in the direction shown by the arrows in Fig. 1. Therefore, the rectifier 13 is connected to polarize auxiliary field 14 in the opposite sense as indicated in Fig. 3. Thus with motor operation the auxiliary field acts to maintain the total flux notwithstanding the weakening effect of armature reaction. As the load current through the motor increases due to change in the mechanical load to which it is assumed the motor is mechanically connected, or due to manipulation of motor controls, the current from the rectifier to the auxiliary field increases so that the auxiliary field imparts a flat compounding characteristic to the motor. If the load current is reversed, or if regeneration causes a reversal of power in the load circuit, any increase in current will increase the effect of the auxiliary field in the same direction as before so that the operation of the motor is still stable.

There is thus provided a device of the character described capable of meeting the objects hereinabove set forth and providing a dynamoelectric machine having a desirable output characteristic which may be made inversely proportional to the demands made upon the machine or which may be made substantially flat, although the machine is not likely to cost or weigh much more than a conventional machine.

While I have illustrated and described particular embodiments of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine for direct current operation, said machine having a stator portion with a main field winding, an auxiliary field winding acting in the same axis as said main field winding, a rotor portion with a commutated armature winding, a set of commutating load brushes, a set of commutating cross brushes substantially in quadrature with said load brushes, and means including connections from said cross brushes through a rectifier unit to said auxiliary field winding for controlling an output characteristic of said machine.

2. A dynamoelectric machine having a stator, a rotor with a commutated rotor winding, a stator field winding adapted to be independently excited, a second stator field winding arranged to produce a component of excitation along the axis of said first stator field winding, a set of load brushes, a set of brushes in quadrature with said load brushes, and means including a rectifier and connections therethrough from said quadrature brushes to said second stator field winding, whereby said machine may be given inverse output characteristics.

3. A direct-current dynamoelectric machine having a stator portion with a main field winding and an auxiliary field winding acting in the same axis as said main field winding, a rotating armature having a commutated winding, a set of load brushes, a set of cross brushes in quadrature with said load brushes, a rectifier, and means including connections from said cross brushes through said rectifier to said auxiliary field winding whereby, when a voltage difference exists between said cross brushes because of armature reaction, said auxiliary field winding is energized at an invariable polarity irrespective of the polarity of said armature reaction.

4. A generator having an armature, a commutator, a separately excited field winding, a second field winding arranged to produce a component of excitation opposing that produced by said separately excited field winding, a set of main brushes, a set of quadrature brushes, a rectifier, and connections from said quadrature brushes through said rectifier to said second field winding, whereby the output voltage of said generator may be varied in inverse relationship to current in said second field winding.

5. A generator having an armature with a commutator, a separately excited field winding, a second field winding arranged to produce a component of excitation opposing that produced by said separately excited field winding, commutating load brushes, commutating quadrature brushes, rectifying means, and means including connections from said quadrature brushes through said rectifying means to said second field winding for energizing said second field winding responsive to armature current, whereby the output voltage of said generator may be varied in inverse relationship with respect to load current in said armature for either direction of flow of said load current.

6. A direct current generator having a stator portion with a main field winding and an auxiliary field winding acting along the same axis as said main field winding, a commutated rotor winding, a set of direct axis commutating brushes, a set of quadrature axis commutating brushes, means providing substantially constant excitation to said main field winding, rectifying means, connections from said quadrature axis brushes to the input of said rectifying means, connections from the output of said rectifying means to said auxiliary field winding arranged to cause said auxiliary field to oppose said main field, and a varying electrical load connecting said load brushes, whereby the output voltage of said generator is inversely proportional to output current as determined by said varying load.

7. A direct current generator having a stator portion provided with pole pieces and a main field winding arranged about said pole pieces, an auxiliary field winding arranged about the same pole pieces, axially extending notches in the inner periphery of each of said pole pieces, a commutated rotor winding, a set of direct axis brushes, a set of cross brushes, commutating armature conductors adjacent said notches, adjustable means for exciting said main field winding, and adjustable means including connections from said quadrature axis brushes through a rheostat and a rectifying means to said auxiliary field winding to cause the output voltage of said generator to vary inversely with output current irrespective of the direction of said output current.

8. A direct current generator having stator pole pieces, a field exciting winding arranged about said pole pieces and adapted to be excited by a separate source of substantially constant excitation, a second field winding arranged about said pole pieces and adapted to produce a component of excitation opposing that of said first-mentioned winding, a set of load brushes, means for completing a circuit between said load brushes through an external load, a set of cross brushes, a slot extending across each pole face where the armature conductors are under commutation, means for rectifying alternating current to direct current, connections from said cross brushes to the alternating current input of said rectifying means, and connections from the direct current output of said rectifying means to said second field winding whereby output voltage of said generator may be made to be inversely proportional to current demand as determined by said external load.

9. A direct current motor having an armature with a commutator, a separately excited field winding, a second field winding arranged to produce a component of excitation cumulative with that produced by said separately excited field winding, a set of main brushes, a set of quadrature brushes, a rectifier, and connections from said quadrature brushes to said rectifier and connections from said rectifier to said second field winding, whereby the speed of operation of said motor may be made substantially constant irrespective of the polarity of power in the circuit of said main brushes.

10. A direct current motor having a stator portion with a main field winding and an auxiliary field winding acting along the same axis as said main field winding, a commutated rotor winding, a set of direct axis commutating brushes, a set of quadrature axis commutating brushes, means providing substantially constant excitation to said main field winding, rectifying means, connections from said quadrature axis brushes to the input of said rectifying means, connections from the output of said rectifying means to said auxiliary field winding arranged to cause said auxiliary field to aid said main field, and a varying mechanical load connected to said motor, whereby the total field caused by said windings is caused to increase at increased load current as determined by said varying load.

11. A direct current motor having a stator portion provided with pole pieces, a main field winding arranged about said pole pieces, an auxiliary field winding arranged about said pole pieces, axially extending notches in the inner periphery of each of said pole pieces, a commutated rotor winding, a set of direct axis brushes, a set of cross brushes, commutating armature conductors adjacent said notches, adjustable means including a rheostat for exciting said main field winding, and adjustable means including a rheostat and connections from said quadrature axis brushes through a rectifying means to said auxiliary field winding to cause the torque of said motor to vary directly with the load current irrespective of the polarity of said current.

MAX A. WHITING.

REFERENCES CITED

The following references are of record in the file of this patent:

UNITED STATES PATENTS

| Number | Name | Date |
|---|---|---|
| 1,952,936 | Murakami | Mar. 27, 1934 |

FOREIGN PATENTS

| Number | Country | Date |
|---|---|---|
| 360,315 | Italy | July 17, 1938 |